United States Patent
Tonomura

(10) Patent No.: US 6,750,776 B2
(45) Date of Patent: Jun. 15, 2004

(54) MACHINES HAVING DRIVE MEMBER AND METHOD FOR DIAGNOSING THE SAME

(75) Inventor: Yukihiro Tonomura, Kusatsu (JP)

(73) Assignee: NEC Machinery Corporation, Shiga-ken (JP)

( * ) Notice: Subject to any disclaimer, the term of this patent is extended or adjusted under 35 U.S.C. 154(b) by 142 days.

(21) Appl. No.: 10/085,986

(22) Filed: Feb. 27, 2002

(65) Prior Publication Data

US 2003/0159515 A1 Aug. 28, 2003

(51) Int. Cl.[7] ............................................. G08B 21/00
(52) U.S. Cl. ....................... 340/679; 340/635; 340/683; 73/660; 73/662; 702/34; 702/35; 702/57
(58) Field of Search ................................. 340/635, 679, 340/683, 657; 73/660, 662; 702/34, 57, 35

(56) References Cited

U.S. PATENT DOCUMENTS

| | | | | |
|---|---|---|---|---|
| 4,429,578 A | * | 2/1984 | Darrel et al. ................. | 73/659 |
| 4,965,513 A | * | 10/1990 | Haynes et al. ............... | 324/158 |
| 6,260,004 B1 | * | 7/2001 | Hays et al. .................. | 702/182 |
| 6,321,602 B1 | * | 11/2001 | Ben-Romdhane ............ | 73/660 |

* cited by examiner

Primary Examiner—Julie Lieu
(74) Attorney, Agent, or Firm—J.C. Patents

(57) ABSTRACT

A method for diagnosing a fabrication machine for a semiconductor device, in which damage condition of components for fast driving can be recognized and failure of the components can be predicted, and the machine are provided. Vibration information of a drive member is sent from a motor controller for controlling a motor connected to the drive member to a machine controller. The vibration information is stored in an information storage in the machine controller and operated in an operational processor, and condition of the drive member according to the operation results is displayed on a display unit at any time. Therefore, when some failure occurs in the drive member, the specifics can be known with the display unit without need for connecting a special analyzer or PC to the fabrication machine for a semiconductor device. Consequently, the machine is capable for self-diagnosing, and thus trouble of the drive member can be prevented from happening.

10 Claims, 3 Drawing Sheets

MACHINES HAVING DRIVE MEMBER AND METHOD FOR DIAGNOSING THE SAME

BACKGROUND OF THE INVENTION

1. Field of the Invention

This invention relates to a machine having a drive member and a method for diagnosing the same and, particularly relates to a method for diagnosing a machine having a drive member having functions in which damage of the drive member is monitored continuously, the damage condition is determined, and whether it is normal or not is self-diagnosed, in fabrication machines for semiconductor devices (for example, die bonders, wire bonders, or taping machines etc.) having the drive members heavily loaded by fast operation. Also, the present invention relates to a machine having such a drive member.

2. Description of the Related Art

Semiconductor dies (hereinafter called "dies") are prepared from 6" or 8" wafers, and then cut into rectangular shape to be formed completed product of dies. The profiles of the dies are variously different including an approximately square with one side from 0.2 mm to 30 mm, or an oblong card-like shape in some cases. The dies are positioned and adhered on leadframes one by one by the die bonder, then respective dies are wire bonded with the leads and molded, thereafter the leadframes are cut by each die to be formed completed leads. Completed product of dies after characteristic inspection is received in pockets of tape by the taping machine. Then, they are mounted on intended places of printed circuit boards by mounters. These processes are generally utilized as a latter process in fabrication of semiconductor products such as ICs, and various fabrication machines for semiconductor devices as described above are used in the process.

Hereinafter, a description will be given with reference to the die bonders as an example among those machines. The die bonder is of a machine which picks the rectangular shape-cut-die up one by one from the wafer and positions the die on a predetermined place of the leadframe. This will be described in detail using FIG. 3. FIG. 3 is a perspective view of the die bonder 1, where a pick-and-place unit 2 is drawn in center area.

The above-mentioned die bonder 1 picks the die 6 in the wafer 4 up one by one using the pick-and-place unit 2, the die being cut into grid-like pattern in a state attached to adhesive sheet 3, and positions the die on a land 8 in the leadframe 7 which advances at a constant pitch.

Cameras (not shown) are placed above the picked-up die 6 and the land 8 on which die 6 is positioned. A former camera is used for recognizing the position of the picked-up die 6 to align its position together with the adhering sheet 3. On the other hand, a latter camera is used for recognizing the position of the land 8 to correct the position of the die 6 in alignment with the recognized land position during transfer.

Therefore, it is required for the pick-and-place unit 2 to move along X-axis (right and left), as well as Y-axis (back and forth) and Z-axis (up and down). The reason of need for the motion along the X-axis is that location of the die 6 must be corrected right and left during transfer, while not shown.

As to the drive member along the Y axis, a motor 9 is provided as a driving source, and a nut 12 moves back and forth due to rotation of a ball screw 11 connected with a rotating shaft of the motor 9. A guide bar 13 is arranged parallel to the screw 11, and thus the nut 12 can move linearly without chattering.

On the other hand, an LM guide (linear moving guide) 14 is arranged on the nut 12, and a die suction head 16 moves up and down along the LM guide 14. Similarly as the above case, for this motion, a motor (not shown) is provided behind a connection bar 17 as a driving source.

Further, for the motion along the X axis in typically utilized method, while not shown as above, the whole of the shown pick-and-place unit 2 is mounted on a sliding unit movable along the X axis, and moved right and left by a motor. Therefore, the pick-and-place unit 2 typically weighs more than 5 kg.

However, there has been following problems in the above conventional die bonders.

Recently, demand for shortening the machine's cycle time increases more and more, so a particular die bonder must be provided responding to the demand. Particularly, in faster types, cycle time of about 0.35 sec/die by the conventional one has been shortened to 0.2–0.25 sec/die. On the contrary, when the die is positioned on the land 8 of the leadframe 7, high positioning accuracy is still required. The reason is that, as the die 6 has become smaller, size margin of the land 8 relative to the size of the die 6 has been correspondingly reduced, or higher positioning accuracy is required increasingly in latter fabrication process (for example wire bonding).

Such highly accurate positioning of die 6 necessarily requires a particular structure as shown in FIG. 3. Then, the pick-and-place unit 2 must weigh heavily corresponding to the structure. When fast operation is done in this condition, mechanical driving components are loaded heavily.

Comparing accelerations along the Y axis as an example, an estimation shows that acceleration will reach to 20 G at a shortened cycle time of 0.2–0.25 sec/die, while it is about 5 G at a prior art cycle time of about 0.35 sec/die.

If the die bonder 1 is continued to be driven under such conditions, the fast driving components (particularly the ball screw or the LM guide) fail soon, resulting in difficulty of normal operation. Once a failure occurs, there are no recovery means except replacement of components. However, in some cases, several days are required for retrieving the bonder after the replacement. Furthermore, this procedure is merely a post-symptomatic-treatment, because failure could not be predicted.

As counter measures to solve these problems, following means have been tried.

If the components have abraded, or original assembly condition was inadequate, chattering or galling may occur in the drive member. It arises as certain vibration having a certain characteristic frequency. Therefore, sensors for detecting the vibration are installed in the drive member so that variation of the vibration can be monitored with the sensors.

However, in this method, the sensors must be installed for a number of the drive members respectively. In frequently used method, amplitude of the vibration is processed and analyzed with FFT (Fast Fourier Transformation), however, in this case FFT analyzer and PC must be connected to the die bonder 1 for each analysis. These requirements cause rise of fabrication cost, complicated structure of the die bonder 1 itself, and troublesome operation for analysis.

Moreover, spans, in which failures occurred, were different for respective die bonders 1 or driven regions, and thus not uniform. As a result, in case analysis was performed in a particular span equally for respective die bonders 1, failure of the drive member could not be found before operation.

Therefore, there is a need for development of a novel die bonder, which can recognize the damage condition of the fast driving components at any time and take a best response based on the condition, even at fast operation. At the same time, there is a need for that each component of the drive member can be assembled under the best condition when the die bonder is assembled, and life of the die bonder is prolonged as long as possible thereby.

It is clear that similar problems exist and must be solved in fabrication machines other than the die bonder as described in beginning, relating to a current demand for faster operation.

SUMMARY OF THE INVENTION

Therefore, in order to solve the above problems, the present invention provides a method for diagnosing a machine having a drive member and the machine, particularly a method for diagnosing a fabrication machine for a semiconductor device and the machine.

A first feature of the present invention is a method for diagnosing a machine having a drive member, the machine having: the drive member moved linearly or rotationally; a motor as a driving source for the drive member; a motor controller for outputting a driving signal to the motor and receiving a current location data signal from the motor; and a machine controller for controlling the entire machine, the method including the steps of creating vibration information of the drive member from the driving signal and the current location data signal by the motor controller; sending the vibration information of the drive member from the motor controller to the machine controller; and diagnosing whether a driving condition of the drive member is normal or not in the machine controller by comparing the vibration information of the drive member with reference vibration information.

A second feature of the invention is the method for diagnosing a machine having a drive member, in which the reference vibration information of the drive member, vibration information at beginning of operation of the drive member, and vibration information during respective fixed periods after beginning of operation are stored in the machine controller; the vibration information at beginning of operation of the drive member and/or the vibration information during each fixed period after beginning of operation is compared with the reference vibration information of the drive member to diagnose whether the driving condition of the drive member is normal or not in the machine controller.

A third feature of the invention is the method for diagnosing a machine having a drive member, in which the reference vibration information of the drive member is set based on a standard abrasion characteristic of the drive member accompanied with time passing after beginning of operation of the drive member.

A fourth feature of the invention is the method for diagnosing a machine having a drive member, in which the vibration information during respective fixed periods after beginning of operation are stored over multiple periods, and vibration information during the latest fixed period is substituted for the stored vibration information during the oldest fixed period sequentially.

A fifth feature of the invention is the method for diagnosing a machine having a drive member, in which the reference vibration information of the drive member, the vibration information at beginning of operation of the drive member, and the vibration information during respective fixed periods after beginning of operation are indicated as a characteristic frequency of the drive member.

A sixth feature of the invention is a machine having a drive member, which includes the drive member moved linearly or rotationally; a motor as a driving source for the drive member; a motor controller for outputting a driving signal to the motor and receiving a current location data signal from the motor; and a machine controller for controlling the entire machine, vibration information of the drive member being created from the driving signal and the current location data signal in the motor controller, the vibration information of the drive member being sent from the motor controller to the machine controller, the machine controller being provided with an information storage for storing the vibration information of the drive member, an operational processor for operating the stored information, and a display unit for displaying a condition of the drive member according to operation results.

A seventh feature of the invention is the machine having a drive member, in which the information storage includes an initial information storage area for storing initial vibration information of the drive member; and period information storage areas for storing vibration information of the drive member during a fixed period, the operational processor operationally compares the initial vibration information of the drive member stored in the initial information storage area with the vibration information of the drive member stored in the multiple period information storage areas, and a condition of the drive member is displayed on the display unit according to operation results.

An eighth feature of the invention is the machine having a drive member, in which the vibration information of the drive member during the fixed time period is transferred among the multiple period information storage areas by turns, and the vibration information of the drive member during the oldest fixed period is deleted by turns.

A ninth feature of the invention is the machine having a drive member, in which the drive member constitutes at least a part of a fabrication machine for a semiconductor device.

The nature, principle, and utility of the invention will become more apparent from the following detailed description when read in conjunction with the accompanying drawings in which like parts are designated by like reference numerals or characters.

DETAILED DESCRIPTION OF THE PREFERRED EMBODIMENTS

Hereinafter, an embodiment of a fabrication machine for a semiconductor device according to the present invention will be described in detail. The same components as those in the prior art example are denoted by the same reference symbols. The description of this embodiment will be also given with reference to a die bonder as an example.

Figure 1:
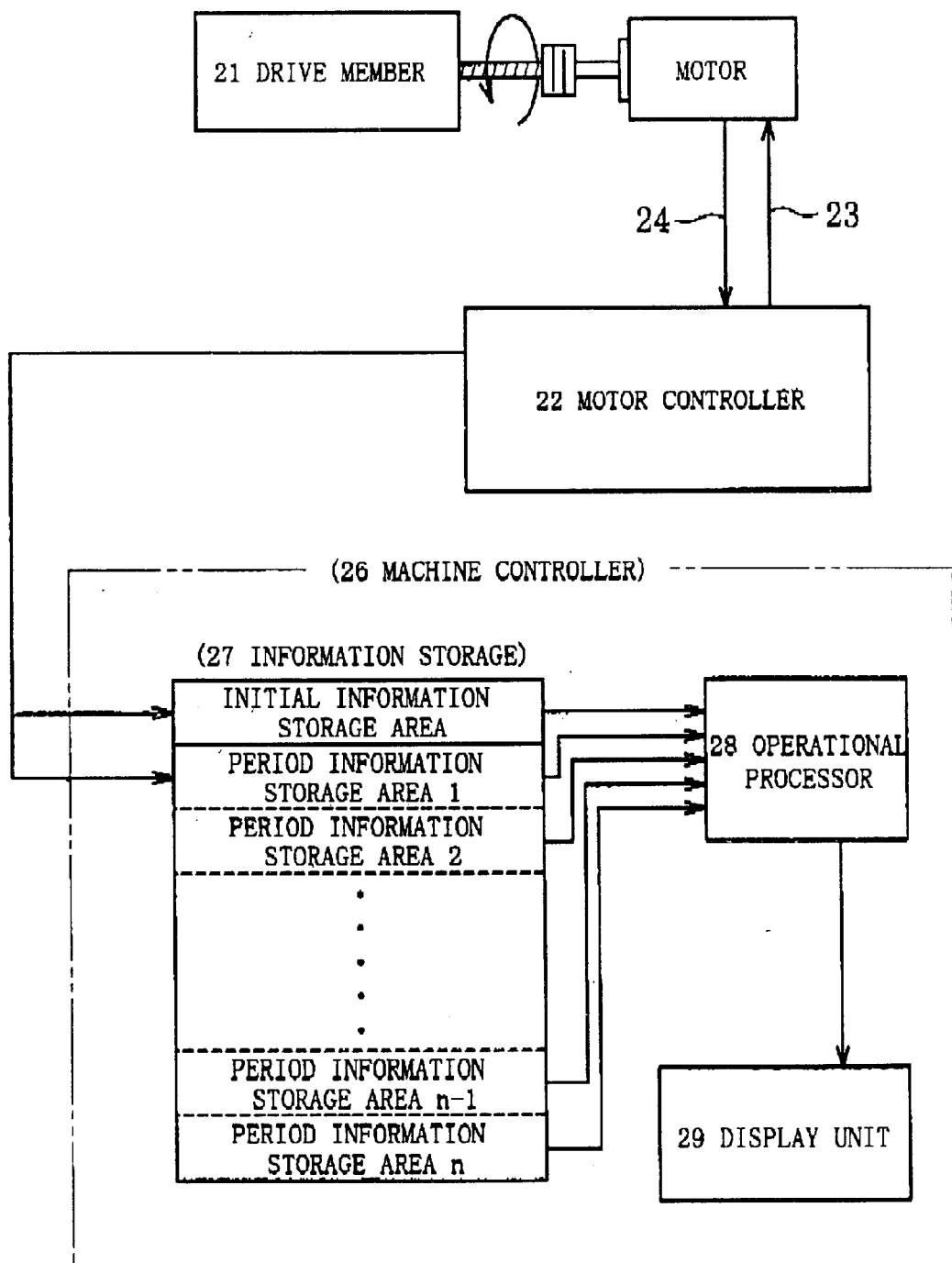
FIG. 1 is a block diagram showing a control system in a die bonder according to an embodiment of the present invention.

FIG. 1 is a block diagram showing a control system of the present invention, which will be described below. A rotating shaft of a motor is connected to a rotating shaft of a linear drive member 21, and the drive member 21 moves back and forth, or right and left due to normal or reverse rotation of the motor.

The motor is of a servomotor and rotates by a predetermined amount according to a driving signal 23 (for example, predetermined pulse signal) received from a motor controller 22. A current location data signal 24 is output to the motor controller 22 from an encoder of the motor.

Herein, the motor controller 22 also functions to read a phase difference between the driving signal 23 and the current location data signal 24, process the results with FFT, and then send it to the machine controller 26 of the die bonder as vibration information of the drive member. The machine controller 26 has an information storage 27, an operational processor 28, and a display unit 29.

The information storage 27 is divided in several areas. First, an initial information storage area is provided alone. In addition, multiple period information storage areas for storing vibration information of the drive member during the fixed period are also provided. FIG. 1 shows n period information storage areas of 1 to n in all.

The initial information storage area firstly stores the vibration information of the drive member 21 at initial operation after assembling the drive member 21 and the motor. In addition, it stores information of tolerance and critical values of amplitude of vibration generated by the drive member 21 relative to operation time. (This will be described in detail later using FIG. 2.)

On the other hand, all of setting time periods of respective period information storage areas are equal, for example, they are supposed to be 30 days. Whenever a normal operation starts, vibration information of the drive member 21 at the moment is sent from the motor controller 22 to the machine controller 26 one by one. After the initial operation has been completed, first 30 days' information after beginning of operation is stored in the period information storage area 1. Since 30 days have passed, the information in the period information storage area 1 is transferred to the period information storage area 2. In this way, as the operation time passes, the information stored initially in the period information storage area 1 reaches to the period information storage area n via the multiple period information storage areas by turns. Thereafter, in case further latest information has been sent from the machine controller 26, the previous information reached to the period information storage area n is disappeared from the information storage 27. That is, the number of the period information storage areas is always constant.

Assuming that n is 12, the information storage 27 is capable of storing about 12 months' information, at the maximum, which always includes the latest information as well as the information at the initial operation.

Next, the information stored in the initial information storage area and the information stored in respective period information storage areas are sent to the operational processor 28. These pieces of information are operationally compared to each other in the operational processor 28, and the condition of the drive member 21 is displayed on the display unit 29 according to the operation results. These will be described in detail below with reference to FIG. 2.

Figure 2:
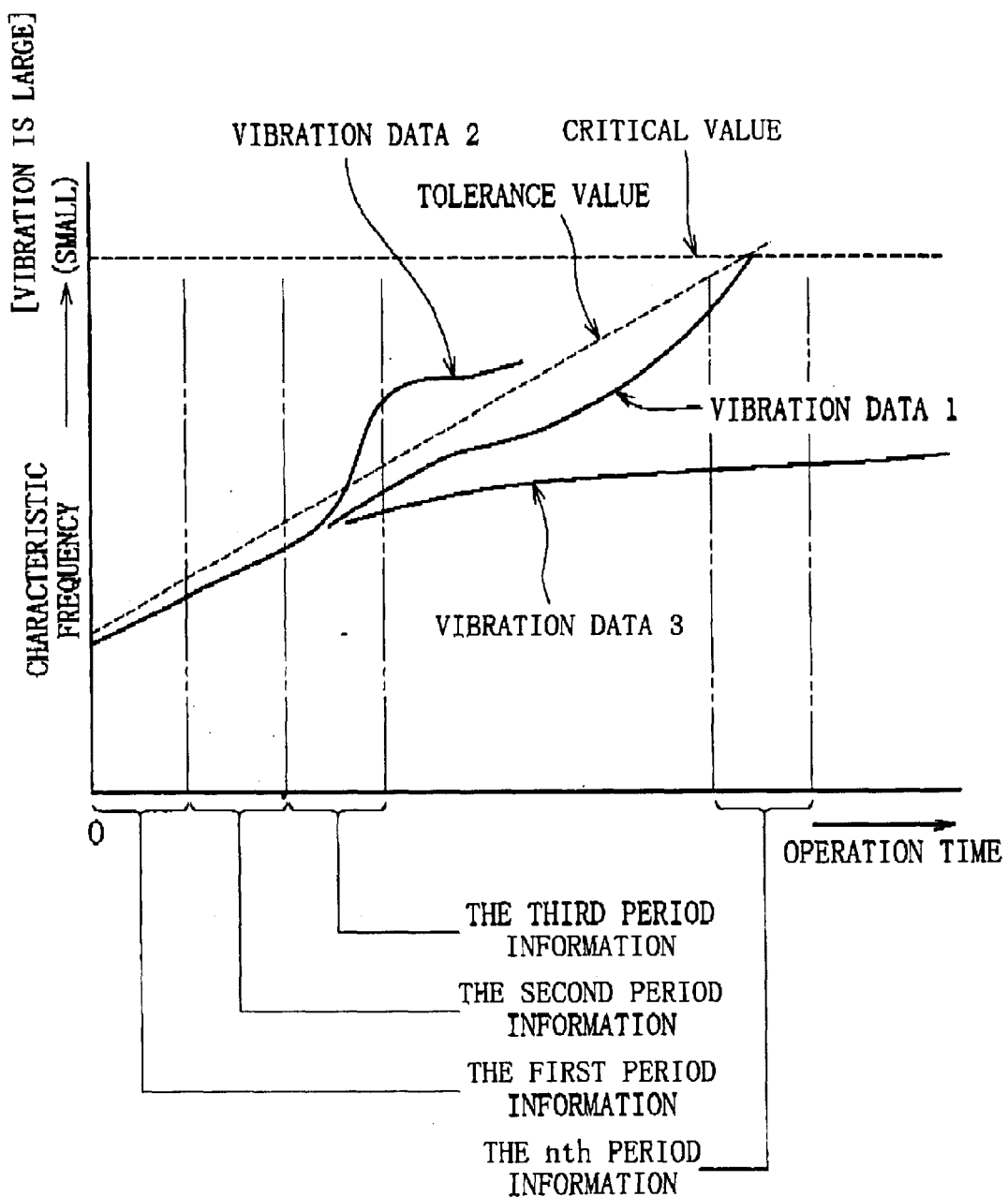
FIG. 2 is a graph showing an aspect that amplitude of vibration of the drive member of the die bonder in FIG. 1 varies with changing operation time.
Figure 3:
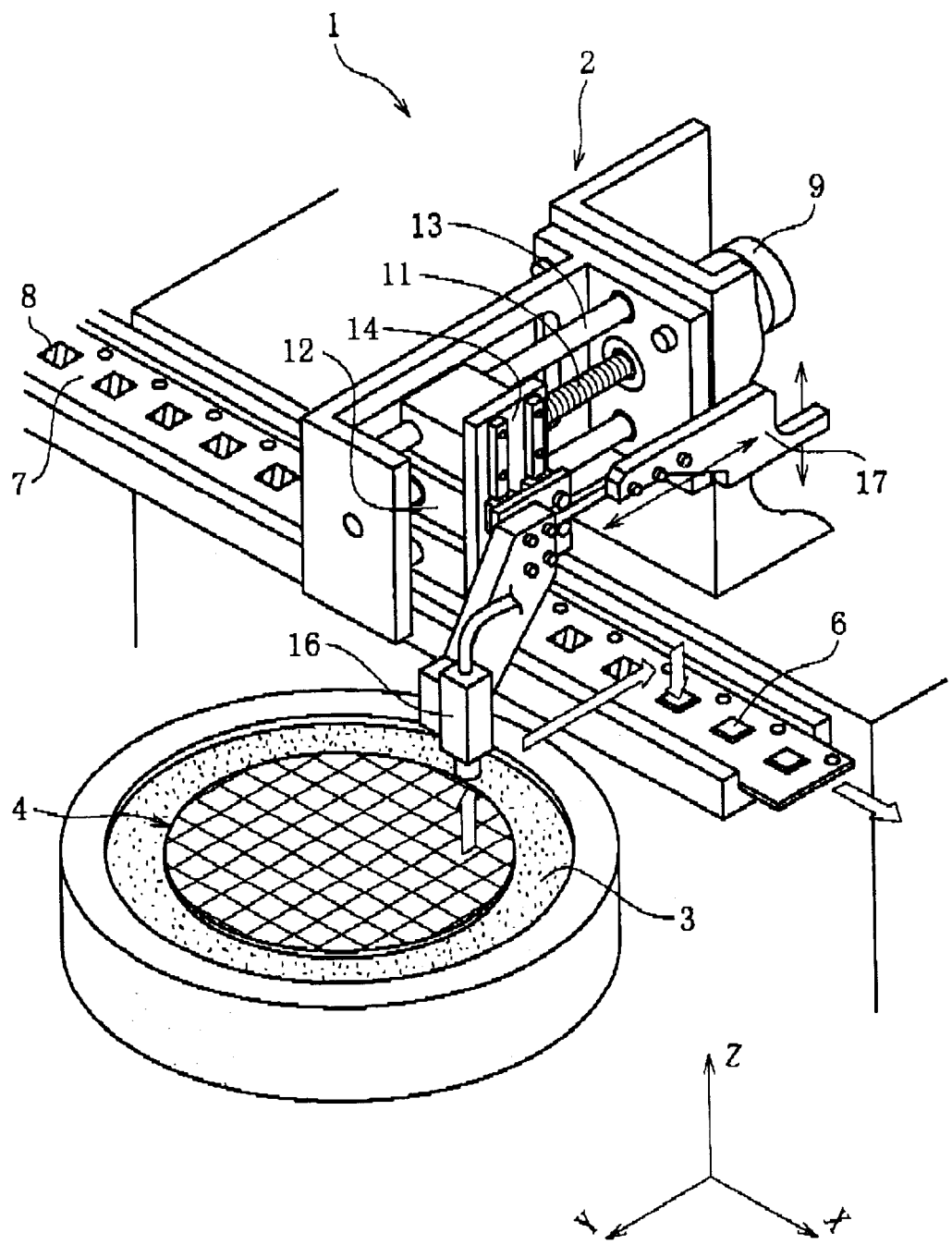
FIG. 3 is a perspective view showing a die bonder, where a pick-and-place unit is mainly drawn.

FIG. 2 is a graph showing operation time in the horizontal axis and a characteristic frequency of a particular drive member 21 in the vertical axis.

The characteristic frequency can be regarded to be an index indicating mechanical stiffness of the drive member 21, where the smaller the index, the lower the stiffness. Chattering of the drive member 21 induces reduction of its characteristic frequency, in other words increase of vibration amplitude.

Generally, as the operation time passes, the mechanical chattering becomes larger or damage becomes more significant, consequently the characteristic frequency of the drive member 21 is reduced. The frequency has a critical value in dimension, and when it lies below a certain degree (upper region of the critical value), further use of the drive member 21 must be prohibited. At the same time, even if the frequency lies within the critical value, a tolerance must be set to every unit of operation time, and in case the frequency lies at the tolerance value or lower (upper region of the tolerance value) temporarily, a certain failure must be considered.

Herein, a description is given referring to following, three, typical vibration data.

First, vibration data 1 in FIG. 2 is described. In this case, while the characteristic frequency meanderingly decreases, it never falls below the tolerance value and reaches to the critical value at time when acquiring the nth period information. Therefore, at that time when acquiring the nth period information, it is displayed on the display unit that life of the components of the drive member has run out, and replacement of the components is prompted thereby.

Next, regarding vibration data 2, the characteristic frequency is suddenly out of tolerance at the time when acquiring the third period information. Therefore, in this case, it is displayed on the display unit that a sudden failure has occurred, and investigation of the reason is prompted thereby.

In some cases, a curve like vibration data 3 may come up, showing a state that the characteristic frequency does not change significantly, or substantially keeps a constant value regardless operation time. The state may occur when the components are of good quality, or assemble condition is adequate. In this case, operation is continued without need for displaying the replacement of components or occurrence of failure. Hereupon, the period information storage areas has been used to the nth area, so the stored, oldest information is disappeared by turns, and further latest information is substitutionally stored in the information storage by turns.

Herein, another feature and the advantages of the present invention will be described.

As described hereinbefore, the vibration information of the drive member is stored in the initial information storage area at initial operation after assembling respective components of the drive member. However, the characteristic frequency may be small and already out of tolerance shown in FIG. 2 at that time. The reason is considered to be poor quality of components or inadequate assemble condition. Therefore, in this case, the components are assembled again, and then the characteristic frequency is adjusted such that it lies within tolerance. If no change is observed after repeating assembly, the components must be replaced.

In other words, according to the present invention, disorder before beginning of operation as well as failure during operation can be known. If this invention is utilized, operation never starts without knowledge of the disorder and failure never occurs immediately.

Hereinbefore, the features of the present invention as well as the actions and advantages have been described. Hereinafter, several supplements will be given.

First, regarding the display unit, while a simple method, in which appropriate electric circuits are configured, and the failure information is indicated with respective display lamps for respective contents of the information, is preferable, in view of expansion of application or future progress, a character display using a monitor such as LCD is more preferable. Further, while the display unit was arranged in the machine controller in the above description, the present invention is not limited to this particular embodiment. The display unit can be separately arranged from the machine controller, and may be designed to be capable of receiving a predetermined signal from the operational processor of the machine controller.

The displayed contents can be of more detail messages, and not limited to the replacement of components or the occurrence of the failure. For this purpose, relation between each of various vibration conditions of the drive member and a state of the drive member under the corresponding condition is obtained, then the relation is used as an experience low, and messages corresponding to the relation are applied. This approach provides more accurate knowledge of failure mode, prevention of the machine trouble, and more correct response. Further, the messages can be more adaptable for existing condition through accumulating data acquisition. At the same time, the critical and tolerance values described in FIG. 2 are preferably rewritten corresponding to the stored data.

Further, in the description hereinbefore, the driving source was of a servomotor, and the current location data was of a signal from an encoder incorporated in the motor. However, the present invention is not limited to the above configuration, and adequately applied to a case that the driving source is of a linear motor, and the current location data is of a value read with a linear scale.

That is, the vibration information of the drive member can be known not only from the case that the rotation motor is used as the driving source, and the drive member moves linearly using the ball screw and the LM guide due to the rotation of the motor, but also from the case that a originally-linear-moving linear motor is used as a driving source and connected to the drive member.

As described hereinbefore, according to the method for diagnosing a machine having a drive member of the present invention, vibration information of the drive member is sent from a motor controller for controlling a motor as a driving source of the drive member to a machine controller, the vibration information is stored in an information storage in the machine controller and operationally compared with reference vibration information in an operational processor, and whether condition of the drive member is adequate or not can be diagnosed according to the operation results.

Further, according to the machine having a drive member of the present invention, the machine includes the drive member moved linearly or rotationally, a motor as a driving source of the drive member, a motor controller for outputting a driving signal to the motor and receiving a current location data signal from the motor, and a machine controller for controlling the entire machine; the motor controller creates vibration information of the drive member from the driving signal and the current location data signal; the vibration information of the drive member is sent from the motor controller to the machine controller; the machine controller is provided with an information storage for storing the vibration information of the drive member, an operational processor for operating the stored information, and a display unit for displaying condition of the drive member according to the operation results. Thereby, the vibration information of the drive member can be operationally compared with reference vibration information in the operational processor in the machine controller, the condition of the drive member according to the operation results can be displayed on the display unit to diagnose whether the condition is adequate or not.

Therefore, when some failure occurs in the drive member, the specifics can be known without need for connecting a special analyzer or PC to the machine. Consequently, machine trouble can be prevented from happening.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A method for diagnosing a machine having a drive member,
    the machine having: the drive member moved linearly or rotationally; a motor as a driving source of the drive member; a motor controller for outputting a driving signal to the motor and receiving a current location data signal from the motor; and a machine controller for controlling the entire machine, the method comprising the steps of:
    creating vibration information of said drive member from said driving signal and said current location data signal by said motor controller;
    sending the vibration information of the drive member from said motor controller to said machine controller; and
    diagnosing whether a driving condition of said drive member is normal or not in said machine controller by comparing said vibration information of said drive member with reference vibration information;
    wherein said vibration information during respective fixed periods after beginning of operation is stored over multiple periods, and vibration information during the latest fixed period is substituted for the stored vibration information during the oldest fixed period sequentially.

2. The method for diagnosing a machine having a drive member according to clam 1, wherein
    said machine controller stores said reference vibration information of said drive member, vibration information of the drive member at beginning of operation, and vibration information during respective fixed periods after beginning of operation, and
    said machine controller compares said vibration information of the drive member at beginning of operation and/or said vibration information during each fixed period after beginning of operation with said reference vibration information of said drive member to diagnose whether the driving condition of said drive member is normal or not.

3. The method for diagnosing a machine having a drive member according to claim 1, wherein
    said reference vibration information of the drive member is set based on a standard abrasion characteristic of the drive member accompanied with time passing after beginning of operation of said drive member.

4. The method for diagnosing a machine having a drive member according to claim 2, wherein
    said reference vibration information of the drive member is set based on a standard abrasion characteristic of the drive member accompanied with time passing after beginning of operation of said drive member.

5. The method for diagnosing a machine having a drive member according to claim 1, wherein said reference vibration information of said dive member, the vibration information at beginning of operation of the drive member, and the vibration information during respective fixed periods after beginning of operation are indicated as a characteristic frequency of the drive member.

6. The method for diagnosing a machine having a drive member according to claim 2, wherein said reference vibration information of said drive member, the vibration information at beginning of operation of the drive member, and the vibration information during respective fixed periods after beginning of operation are indicated as a characteristic frequency of the drive member.

7. The method for diagnosing a machine having a drive member according to claim 3, wherein said reference vibration information of said drive member, the vibration information at beginning of operation of the drive member, and the vibration information during respective fixed periods after beginning of operation are indicated as a characteristic frequency of the drive member.

8. The method for diagnosing a machine having a drive member according to claim 4, wherein said reference vibration information of said drive member, the vibration information at beginning of operation of the drive member, and the vibration information during respective fixed periods after beginning of operation are indicated as a characteristic frequency of the drive member.

9. A machine having a drive member, the machine having:

the drive member moved linearly or rotationally;

a motor as a driving source for the drive member;

a motor controller for outputting a driving signal to the motor and receiving a current location data signal from the motor; and a machine controller for controlling the entire machine, wherein said motor controller creates vibration information of said drive member from said driving signal and said current location data signal, the vibration information of the drive member is sent from said motor controller to said machine controller, and said machine controller is provided with an information storage for storing said vibration information of said drive member, an operational processor for operating the stored information, and a display unit for displaying a condition of said drive member according to operation results; and wherein said information storage has n initial information storage area for storing initial vibration information of the drive member, and period information storage areas for storing vibration information of the drive member during a fixed period, said operational processor operationally compares the initial vibration information of the drive member stored in the initial information storage area with the vibration information of the drive member stored in the multiple period information storage areas, and a condition of said drive member is displayed on said display unit according to operation results, and wherein said vibration information of the drive member during a fixed period is transferred among said multiple period information storage areas, and the vibration information of the drive member during the oldest fixed period is deleted by turns.

10. The machine having a drive member according to claim 9, wherein said drive member constitutes at least a part of a fabrication machine for a semiconductor device.

* * * * *